US012593299B2

(12) United States Patent
Dong

(10) Patent No.: US 12,593,299 B2
(45) Date of Patent: Mar. 31, 2026

(54) INFORMATION TRANSMISSION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 550 days.

(21) Appl. No.: 18/049,824

(22) Filed: Oct. 26, 2022

(65) Prior Publication Data
US 2023/0075773 A1      Mar. 9, 2023

Related U.S. Application Data

(63) Continuation of application No. PCT/CN2020/087494, filed on Apr. 28, 2020.

(51) Int. Cl.
*H04L 5/00*          (2006.01)
*H04W 64/00*          (2009.01)

(52) U.S. Cl.
CPC ........... *H04W 64/00* (2013.01); *H04L 5/0048* (2013.01)

(58) Field of Classification Search
CPC ..... H04L 5/0048; H04L 5/005; H04L 5/0051; H04W 4/02; H04W 4/021; H04W 4/025; H04W 4/026; H04W 4/027; H04W 4/029; H04W 64/00; H04W 64/006
See application file for complete search history.

(56) References Cited

U.S. PATENT DOCUMENTS

2020/0154240 A1 *    5/2020    Edge ...................... H04W 4/029
2020/0236644 A1 *    7/2020    Gunnarsson .......... H04W 64/00

FOREIGN PATENT DOCUMENTS

WO      WO 2019182707 A1      9/2019
WO      WO-2020067848 A1 *    4/2020    ........... H04L 5/0048

OTHER PUBLICATIONS

European Patent Office, Extended European Search Report issued in Application No. 20933568.6 dated Dec. 4, 2023, 8 pages.
Qualcomm Incorporated, "On Demand Transmission of PRS for NR", 3GPP TSG-RAN WG2 Meeting #105, R2-1901373, Athens, Greece, Feb. 25-Mar. 1, 2019, 15 pages.
Examination report for India Application No. 202247065606, issued on Jan. 13, 2023, 6 pages.
International Search Report and Written Opinion for PCT Application No. PCT/CN2020/087494, issued Jan. 27, 2021.
Qualcomm Incorporated: "On Demand Transmission of PRS for NR", 3GPP TSG-RAN WG2 Meeting #104, R2-1817902, Spokane, USA, Nov. 12-16, 2018, 26 pages.

* cited by examiner

*Primary Examiner* — Matthew W Genack
(74) *Attorney, Agent, or Firm* — Finnegan, Henderson, Farabow, Garrett & Dunner, L.L.P.

(57) ABSTRACT

A method for information transmission includes: receiving a first request message carrying a recommended positioning reference signal (PRS) configuration; determining a target PRS configuration according to the recommended PRS configuration; and sending a PRS to a user equipment by using the target PRS configuration.

16 Claims, 10 Drawing Sheets

INFORMATION TRANSMISSION METHOD AND APPARATUS, AND COMMUNICATION DEVICE AND STORAGE MEDIUM

CROSS-REFERENCE TO RELATED APPLICATION

This application is a continuation application of International Application No. PCT/CN2020/087494 filed on Apr. 28, 2020, the content of which is hereby incorporated by reference in its entirety.

TECHNICAL FIELD

The disclosure relates to the field of wireless communication technologies, and in particular to, a method and an apparatus for information transmission, a communication device, and a storage medium.

BACKGROUND

The $5^{th}$ generation (5G) cellular mobile communication technology in the R16 version introduces various positioning technologies, realizing user equipment (UE) positioning using the cellular mobile communication network. During a positioning process, a network side sends positioning assistance information to the UE to provide a positioning reference signal (PRS) configuration. For example, a location management function (LMF) may send the positioning assistance information to a base station through a new radio positioning protocol A (NRPPa) message, and the base station sends it to the UE through a system message.

SUMMARY

According to a first aspect of embodiments of the disclosure, a method for information transmission is provided. The method is performed by a base station and includes: receiving a first request message carrying a recommended PRS configuration; determining a target PRS configuration according to the recommended PRS configuration; and sending a PRS to a UE using the target PRS configuration.

According to a second aspect of embodiments of the disclosure, a method for information transmission is provided. The method is performed by a UE and includes: sending a first request message carrying a recommended PRS configuration, wherein the recommended PRS configuration is configured for a base station to determine a target PRS configuration; and receiving a PRS sent by the base station based on the target PRS configuration.

According to a third aspect of embodiments of the disclosure, a communication device is provided, including a processor, a transceiver, a memory storing a program executable by the processor. The processor is configured to perform the method for information transmission according to the first aspect or the second aspect when executing the executable program.

According to a fourth aspect of embodiments of the disclosure, a non-transitory storage medium on which an executable program is stored is provided, and when the executable program is executed by a processor, the method for information transmission is performed according to the first aspect or the second aspect.

With the method and the apparatus for information transmission, the communication device, and the storage medium, provided in embodiments of the disclosure, the base station receives the first request message carrying the recommended PRS configuration; determines the target PRS configuration according to the recommended PRS configuration; and sends the PRS to the UE using the target PRS configuration. In this way, the target PRS configuration is determined according to the recommended PRS configuration of the UE. On one hand, a report of positioning requirement is realized through the recommended PRS configuration, and the base station can dynamically select the target PRS configuration, realizing the dynamic selection of the PRS configuration, and improving the flexibility of the PRS configuration selection. On the other hand, the UE reports the recommended PRS configuration according to its own positioning requirement. The base station determines the target PRS configuration according to the recommended PRS configuration of the UE, which can satisfy the positioning requirement of the UE and improve the adaptability of the PRS configuration to positioning scenarios.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the word "if" as used herein can be interpreted as "when", "while" or "in response to determining".

Figure 1:
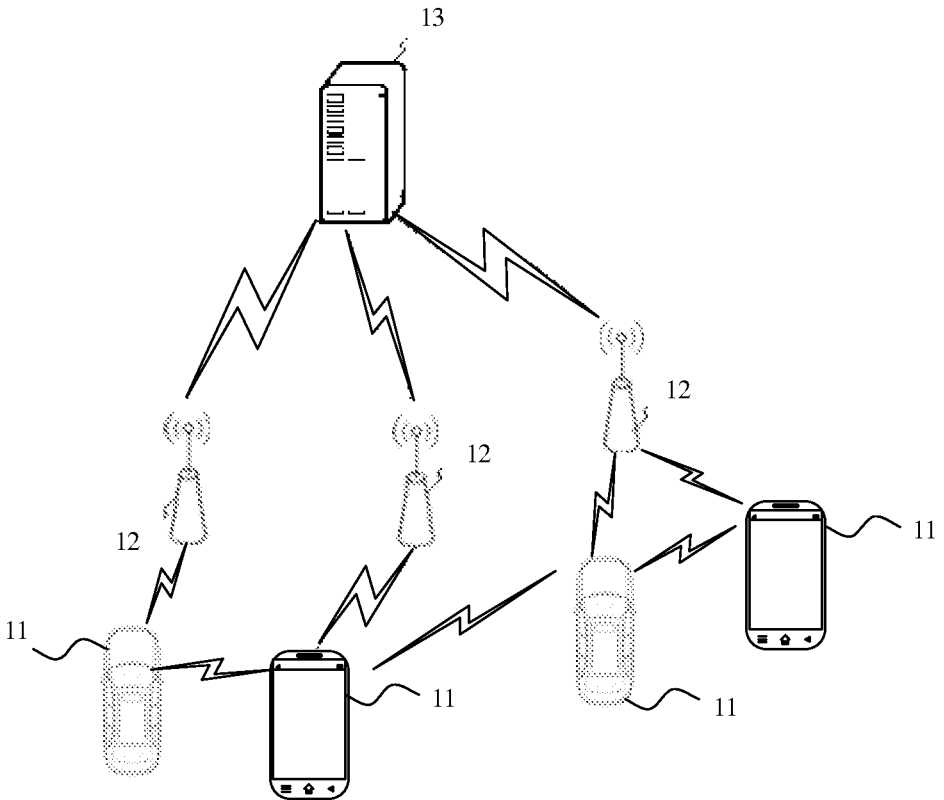
FIG. 1 is a schematic diagram of a wireless communication system according to some embodiments.

Referring to FIG. 1, FIG. 1 illustrates a schematic diagram of a wireless communication system according to some embodiments of the disclosure. As illustrated in FIG. 1, the wireless communication system is a communication system based on cellular mobile communication technologies. The wireless communication system includes terminals 11 and base stations 12.

The terminal 11 may be a device that provides voice and/or data connectivity to a user. The terminal 11 may communicate with one or more core networks via a radio access network (RAN). The terminal 11 may be an Internet of Things (IoT) UE such as a sensor device, a mobile phone (or "cellular" phone) and a computer with the IoT UE. The terminal 11 may be a fixed, portable, pocket, hand-held, computer built-in or a vehicle-mounted device, for example, a station (STA), a subscriber unit, a subscriber station, a mobile station, a mobile, a remote station, an access point, a remote terminal, an access terminal, a user terminal, a user agent, a user device, or a UE. Alternatively, the terminal 11 may also be a device of an unmanned aerial vehicle. Alternatively, the terminal 11 may also be a vehicle-mounted device, for example, an engine control unit (ECU) with a wireless communication function or a wireless communication device externally connected to the ECU. Alternatively, the terminal 11 may also be a roadside device, for example, a street light, a signal light, or other roadside devices with a wireless communication function.

The base station 12 may be a network-side device in the wireless communication system. The wireless communication system may be a $4^{th}$ generation (4G) mobile communication system, also known as a long term evolution (LTE) system. Or, the wireless communication system may also be a $5^{th}$ generation (5G) mobile communication system, also known as a new radio (NR) system or 5G NR system. Alternatively, the wireless communication system may also be a next-generation system of the 5G system. The access network in the 5G system may be called new generation-radio access network (NG-RAN), or machine-type communication (MTC) system.

The base station 12 may be an evolved base station (eNB) employed in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with protocol stacks of a packet data convergence protocol (PDCP) layer, a radio link control (RLC) layer, and a media access control (MAC) layer. A protocol stack of a physical (PHY) layer is set in the DU. The specific implementation manner of the base station 12 is not limited in embodiments of the disclosure.

A wireless connection can be established between the base station 12 and the terminal 11 through a radio air interface. In different embodiments, the radio air interface may be a radio air interface based on the 4G mobile communication network technology standard, or the radio air interface may be a radio air interface based on the 5G mobile communication network technology standard, for example, the radio air interface is a NR, or, the radio air interface may also be a radio air interface based on a next generation of 5G mobile communication network technology standard In some embodiments, an end to end (E2E) connection may also be established between the terminals 11, for example, scenes of vehicle to vehicle (V2V) communication, vehicle to infrastructure (V2I) communication and vehicle to pedestrian (V2P) communication in vehicle to everything (V2X) communication.

In some embodiments, the above wireless communication system may further include a network management device 13.

Base stations 12 are connected to the network management device 13 respectively. The network management device 13 may be a core network device in the wireless communication system, for example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS). The implementation form of the network management device 13 is not limited in some embodiments of the disclosure.

Execution subjects involved in embodiments of the disclosure include, but are not limited to terminals such as UEs that support sidelink communication, and base stations for cellular mobile communication.

Figure 2A:
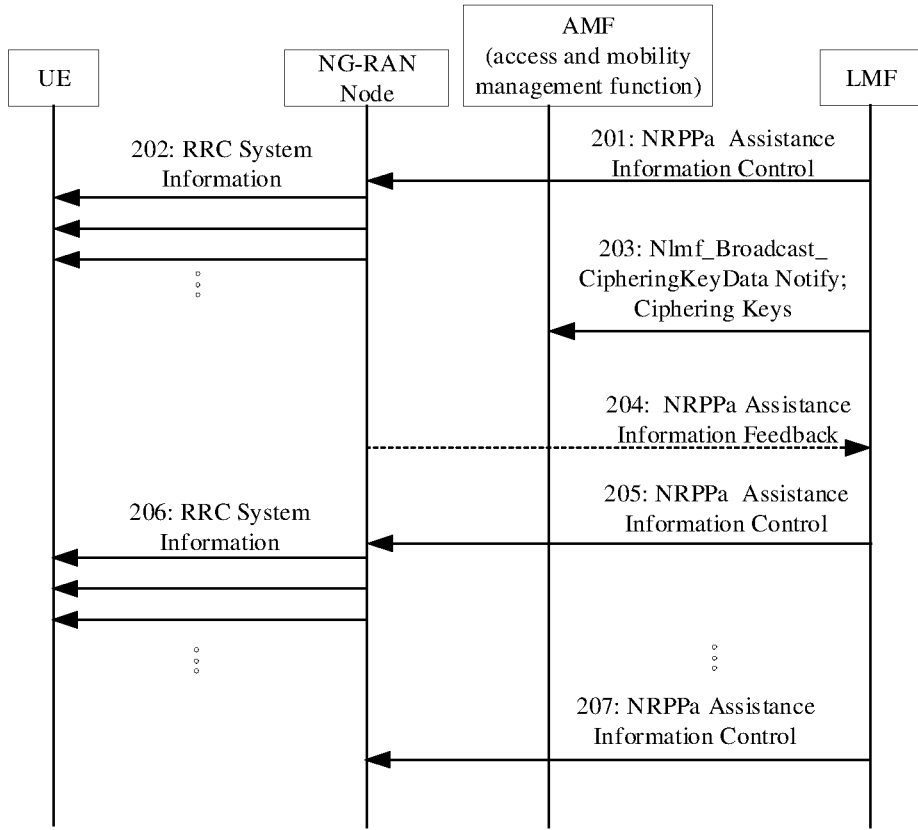
FIG. 2A is a schematic diagram of assistance information exchange of NRPPa according to some embodiments.

In some embodiments, the core network sends positioning assistance information to the base station through the NRPPa message, and the base station sends it to the UE through the system message. The steps are illustrated in FIG. 2A.

In step 201, a location management function (LMF) sends NRPPa assistance information control to a new generation-radio access network (NG-RAN) node.

In step 202, the NG-RAN node sends RRC system information to UE.

In step 203, the LMF sends a notification (e.g., Nlmf-_Broadcast_CipheringKeyData) and keys (e.g., Ciphering Keys) to an access and mobility management function (AMF).

In step 204, the NG-RAN node sends NRPPa assistance information feedback to the LMF.

The above steps may be repeated. For example, in step 205, the LMF sends NRPPa assistance information control to the NG-RAN node.

In step 206, the NG-RAN node sends RRC system information to the UE.

In step 207, the LMF sends NRPPa assistance information control to the NG-RAN node.

Through the information transmission mechanism in FIG. 2A, the network side can send positioning assistance information to the UE. Some broadcasted system messages carry positioning assistance information. Positioning assistance information includes information related to PRS configuration(s) for the UE to perform a positioning measurement.

In addition, the UE can request a positioning system message in an on-demand manner. When the UE is in a RRC connection state, it can request based on a type of system information block (SIB); and when the UE is in an RRC idle state or in an inactive state, it can request based on a system information message (SI Message). The network sends the positioning system message according to the request from the UE.

The PRS configuration mode of the R16 version is static configuration. When the UE has a positioning requirement, the network side sends a fixed PRS configuration to the UE for positioning. It may not satisfy different positioning requirements of the UE.

Figure 2B:
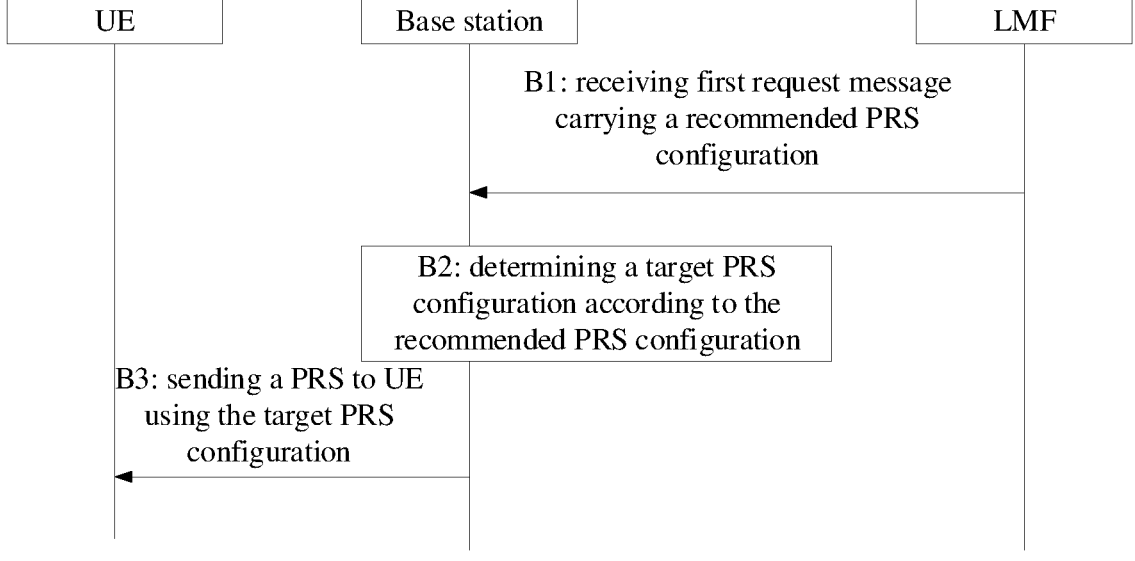
FIG. 2B, FIG. 2C and FIG. 2D are flowcharts of interaction among a UE, a base station and a LMF according to some embodiments.
Figure 2C:
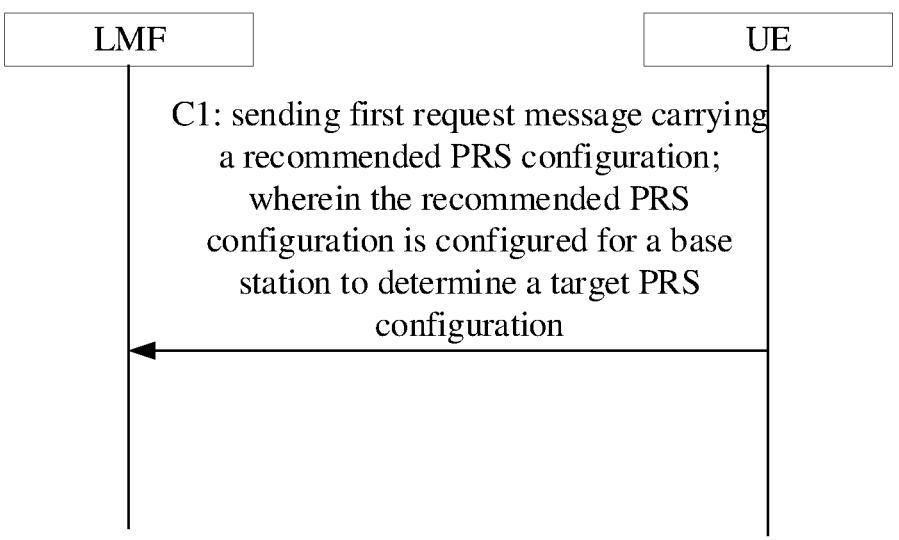
Figure 2D:
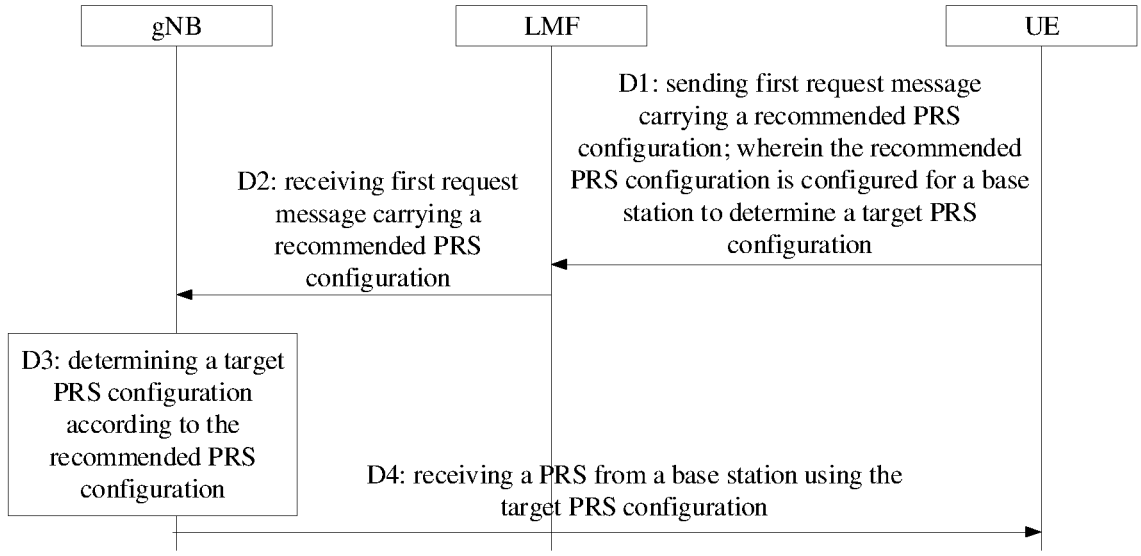

FIG. 2B, FIG. 2C and FIG. 2D are flowcharts of interaction among a UE, a base station and a LMF, according to some embodiments.

As illustrated in FIG. 2B, for the base station side, the following steps are performed.

In step B1, the base station receives a first request message carrying a recommended PRS configuration from the LME In step B2, the base station determines a target PRS configuration according to the recommended PRS configuration.

In step B3, the base station sends a PRS to the UE using the target PRS configuration.

As illustrated in FIG. 2C, for the UE side, the following steps are performed.

In step C1, the UE sends a first request message carrying a recommended PRS configuration.

As illustrated in FIG. 2D, for the base station, LMF and UE, the following steps are performed.

In D1, the UE sends a first request message carrying a recommended PRS configuration to the LMF.

In D2, the base station receives the first request message carrying the recommended PRS configuration from the LME In D3, the base station determines a target PRS configuration according to the recommended PRS configuration.

In D4, the base station sends a target PRS to the UE using the target PRS configuration.

Figure 3:
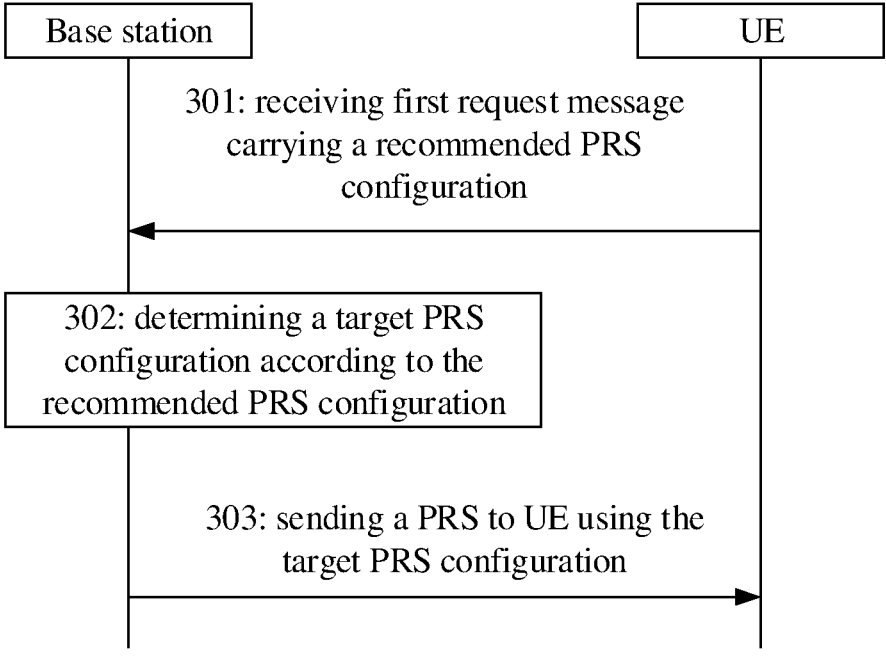
FIG. 3 is a flowchart of a method for information transmission according to some embodiments.

FIG. 3 is a flowchart of a method for information transmission according to some embodiments. In the base station of the wireless communication system, the method may include the following.

In step 301, a first request message carrying a recommended PRS is received.

In step 302, a target PRS configuration is determined according to the recommended PRS configuration.

In step 303, a PRS is sent to a UE using the target PRS configuration.

The wireless communication system may include, but is not limited to, a 5G cellular mobile communication system. The UE may include a phone terminal or the like.

In the cellular mobile communication, the UE can perform positioning based on PRSs. The UE can respectively measure time of arrivals (TOAs) of PRSs sent by a plurality of base stations, and perform positioning by means of triangulation using time difference of TOAs and arrival sides of the PRSs.

The first request message may be sent by the UE to request system information. The base station may send the system information according to content requested by the first request message, for example, the first request message may request system information for positioning.

The PRS configuration may include: a PRS period, a PRS occupied bandwidth, a number of transmission and reception points (TRPs), or the like.

Positioning accuracies obtained based on different PRS configurations may be different. For example, the shorter the PRS period, and/or the denser in the frequency domain, the higher the positioning accuracy. Different PRS configurations have different positioning overheads. For example, the shorter the PRS period, and/or the denser in the frequency domain, the greater the positioning overhead.

The recommended PRS configuration may be a PRS configuration determined by the UE based on its own positioning accuracy and/or load. The UE can determine the required positioning accuracy based on its own positioning scenario, and determine the recommended PRS configuration. Alternatively, the UE may determine the tolerable positioning overhead based on its own load condition, and determine the recommended PRS configuration. Different positioning scenarios have different requirements for positioning accuracy. For example, pedestrian navigation requires the higher positioning accuracy than vehicle navigation. In this way, the UE can send the recommended PRS configuration that can satisfy the current positioning requirement to the base station. The recommended PRS configuration can be selected from the PRS configurations agreed upon in advance by the base station and the UE, or can be determined separately by the UE.

The target PRS configuration is a configuration that may be determined by the base station and finally used to send the PRS. The base station may determine the target PRS configuration based on the recommended PRS configuration. The target PRS configuration can be the same as or different from the recommended PRS configuration.

The base station may pre-set PRS configuration determination rules to determine the target PRS configuration. The recommended PRS configuration can be determined as the target PRS configuration, or a PRS configuration close to the recommended PRS configuration can be prioritized as the target PRS configuration. In this way, the base station can determine the positioning requirement of the UE such as the positioning accuracy based on the recommended PRS configuration, and the target PRS configuration selected by the base station can try its best to satisfy the different positioning requirements of the UE.

In this way, based on the recommended PRS configuration of the UE, the target PRS configuration is determined. On one hand, a report of positioning requirement is realized through the recommended PRS configuration, and the base station can dynamically select the target PRS configuration, realizing the dynamic selection of the PRS configuration, and improving the flexibility of the PRS configuration selection. On the other hand, the UE reports the recommended PRS configuration according to its own positioning requirement. The base station determines the target PRS configuration according to the recommended PRS configuration of the UE, which can satisfy the positioning requirement of the UE and improve the adaptability of the PRS configuration to positioning scenarios.

In some embodiments, the method may further include: sending system information, in which the system information carries one or more candidate PRS configurations, and the one or more candidate PRS configurations are configured for the UE to select the recommended PRS configuration according to a configuration selection condition.

The base station may preset one or more candidate PRS configurations based on its own load situation and/or current network support capability. One or more candidate PRS configurations are sent to the UE through the system information. Different candidate PRS configurations may have different PRS periods, and/or PRS occupied bandwidths, and/or the numbers of TRPs, or the like.

The base station can send the system information by broadcasting. Or, the base station may unicast the system information to the UE through an RRC message based on the user's request.

After receiving the one or more candidate PRS configurations, the UE can select the recommended PRS configuration from the one or more candidate PRS configurations when there is a positioning requirement, and send it to the base station.

The configuration selection condition can be set according to the positioning requirement. The positioning requirements can be different positioning accuracies or the like. Different positioning accuracies requires different PRS configurations.

In this way, the base station determines the range of candidate PRS configurations, and the UE selects from the range of candidate PRS configurations, reducing the situation that the UE blindly determines the recommended PRS configuration and thus improving the efficiency of determining the PRS configuration.

In some embodiments, step 301 may include: receiving the first request message carrying a configuration identifier of the recommended PRS configuration.

The base station can identify each candidate PRS configuration. A unique configuration identifier can be set for each candidate PRS configuration.

When the base station delivers the candidate PRS configurations, it can carry the configuration identifiers of the candidate PRS configurations at the same time.

For example, the configuration identifier 1 corresponds to the candidate PRS configuration including: PRS period 1, PRS bandwidth 1, and the like.

After receiving the candidate PRS configurations and the configuration identifiers of the candidate PRS configurations, the UE selects the recommended PRS configuration from the candidate PRS configurations, and sends the recommended PRS configuration. The UE can send the detailed configuration of the recommended PRS configuration, such as the period; it can also carry the recommended PRS configuration at the same time; or it can also send only the configuration identifier of the recommended PRS configuration.

In this way, when only the configuration identifier of the recommended PRS configuration is sent, the amount of data sent can be reduced, thereby reducing the overhead.

In some embodiments, the one or more candidate PRS configurations are carried in new radio downlink PRS assistance data of new radio downlink measurement assistance data information element (IE) of a type 6-1 of the system information.

The new radio downlink PRS assistance data (nr-DL-PRS-AssistanceData) in the new radio downlink measurement assistance data information element (the NR-DL-Measurement-AD) in the positioning system message type 6-1 (posSibType6-1) carries the one or more candidate PRS configurations.

In this way, the existing information is reused to carry the candidate PRS configurations, and the utilization efficiency of the existing information is improved.

In some embodiments, the method may further include: sending the target PRS configuration to the UE in response to the first request message, in which the target PRS configuration is configured to indicate the UE to receive the PRS.

If the base station does not send the candidate PRS configurations in advance, after the base station receives the recommended PRS configuration, the base station can determine the target PRS configuration in real time based on its own load situation and/or current network support capability and send it to the UE.

If the recommended PRS configuration is selected by the UE from the one or more candidate PRS configurations pre-sent by the base station, after the base station receives the recommended PRS configuration, it can select the target PRS configuration from the candidate PRS configurations that suit its own load situation and/or current network support capability. The target PRS configuration can be the same as or different from the recommended PRS configuration.

In response to the recommended PRS configuration in the first request message, after the base station determines the target PRS configuration, it can downlink the target PRS configuration to the UE by carrying the target PRS configuration in a RRC signaling or the like.

After receiving the target PRS configuration, the UE can receive the PRS on configuration resources such as a period and bandwidth indicated by the target PRS configuration according to the target PRS configuration, and then realize positioning.

In some embodiments, the first request message may include: a first IE including the recommended PRS configuration; and a second IE including a request of triggering system information.

The first IE is different from the second IE. The first IE may be a newly-added IE, or the first IE is an IE other than the second IE in the first request message that has reserved bits and can carry the recommended PRS configuration.

The UE may add an IE to the first request message to carry the recommended PRS configuration. The recommended PRS configuration can also be characterized by a configuration identifier.

For example, the UE may add an IE to the first request message to carry the configuration identifier of the recommended PRS configuration. For example, the PRS configuration represented by the configuration identifier 1: PRS period 1 and PRS bandwidth 1.

Or the UE may add an IE to the first request message to carry detailed configuration information of the recommended PRS configuration. For example, a new IE is added, and the IE includes: PRS period, PRS bandwidth and other information.

Using the newly added IE to carry the recommended PRS configuration can increase the amount of information carried in the existing information and improve the efficiency of the first request message.

In some embodiments, step 301 may include: receiving the first request message carrying the recommended PRS configuration, sent by the UE in an on-demand manner.

The on-demand manner may be a manner in which the UE receives one or more candidate PRS configurations when there is a positioning requirement, and selects the recommended PRS configuration from one or more candidate PRS configurations, and sends it to the base station.

In the on-demand manner, the UE can receive the system information with the candidate PRS configurations only when required, and/or analyze the candidate PRS configurations in the system information. It can save the cost of the UE.

In some embodiments, receiving the first request message carrying the recommended PRS configuration, sent by the UE in the on-demand manner includes one of the following: receiving a DedicatedSIBRequest carrying the recommended PRS configuration; or receiving a dedicated RRC-SystemInfoRequest carrying the recommended PRS configuration.

When the UE is in the RRC connected state, the recommended PRS configuration can be carried in the Dedicated-SIBRequest message.

When the UE is in the idle or inactive state, the recommended PRS configuration can be carried in the RRCSystemInfoRequest message.

In this way, using different messages to carry the recommended PRS configuration can adapt to different UE states, which improves the adaptability of the recommended PRS configuration in the uplink.

Figure 4:
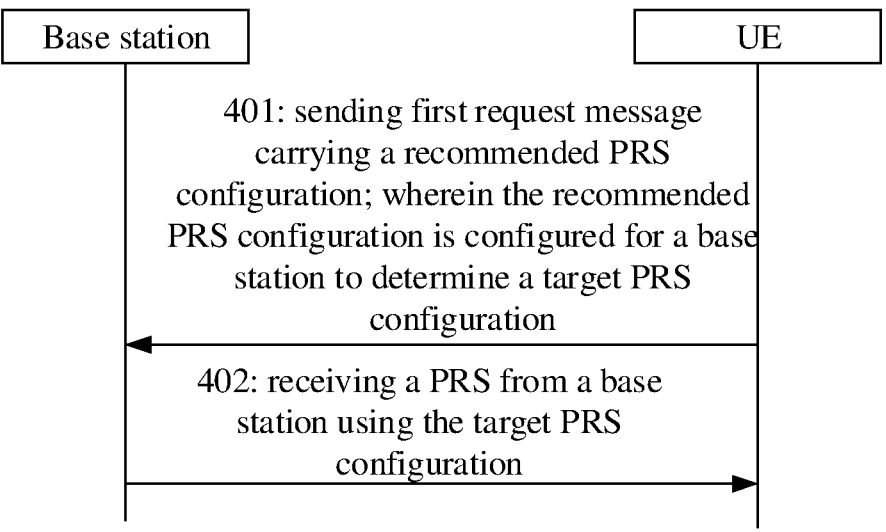
FIG. 4 is a flowchart of a method for information transmission according to some embodiments.

FIG. 4 is a flowchart of a method for information transmission according to some embodiments. In the UE of the wireless communication system, the method may include the following.

In step 401, a first request message carrying a recommended PRS configuration is sent, in which the recommended PRS configuration is configured for a base station to determine a target PRS configuration.

In step 402, a PRS is received from the base station using the target PRS configuration.

The wireless communication system may include, but is not limited to, a 5G cellular mobile communication system. The UE may include a phone terminal or the like.

In the cellular mobile communication, the UE can perform positioning based on PRSs. The UE can respectively measure TOAs of PRSs sent by a plurality of base stations, and perform positioning by means of triangulation using time difference of TOAs and arrival sides of the PRSs.

The first request message may be sent by the UE to request system information. The base station may send the system information according to content requested by the first request message, for example, the first request message may request system information for positioning.

The PRS configuration may include: a PRS period, a PRS occupied bandwidth, a number of transmission and reception points (TRPs), or the like.

Positioning accuracies obtained based on different PRS configurations may be different. For example, the shorter the PRS period, and/or the denser in the frequency domain, the higher the positioning accuracy. Different PRS configurations have different positioning overheads. For example, the shorter the PRS period, and/or the denser in the frequency domain, the greater the positioning overhead.

The recommended PRS configuration may be a PRS configuration determined by the UE based on its own positioning accuracy and/or load. The UE can determine the required positioning accuracy based on its own positioning scenario, and determine the recommended PRS configuration. Alternatively, the UE may determine the tolerable positioning overhead based on its own load condition, and determine the recommended PRS configuration. Different positioning scenarios have different requirements for positioning accuracy. For example, pedestrian navigation requires the higher positioning accuracy than vehicle navigation. In this way, the UE can send the recommended PRS configuration that can satisfy the current positioning requirement to the base station. The recommended PRS configuration can be selected from the PRS configurations agreed upon in advance by the base station and the UE, or can be determined separately by the UE.

The target PRS configuration is a configuration that may be determined by the base station and finally used to send the PRS. The base station may determine the target PRS configuration based on the recommended PRS configuration.

The target PRS configuration can be the same as or different from the recommended PRS configuration.

The base station may pre-set PRS configuration determination rules to determine the target PRS configuration. The recommended PRS configuration can be determined as the target PRS configuration, or a PRS configuration close to the recommended PRS configuration can be prioritized as the target PRS configuration. In this way, the base station can determine the positioning requirement of the UE such as the positioning accuracy based on the recommended PRS configuration, and the target PRS configuration selected by the base station can try its best to satisfy the different positioning requirements of the UE.

In this way, based on the recommended PRS configuration of the UE, the target PRS configuration is determined. On one hand, a report of positioning requirement is realized through the recommended PRS configuration, and the base station can dynamically select the target PRS configuration, realizing the dynamic selection of the PRS configuration, and improving the flexibility of the PRS configuration selection. On the other hand, the UE reports the recommended PRS configuration according to its own positioning requirement. The base station determines the target PRS configuration according to the recommended PRS configuration of the UE, which can satisfy the positioning requirement of the UE and improve the adaptability of the PRS configuration to positioning scenarios.

In some embodiments, before step 401, the method may include: receiving system information, in which the system information carries one or more candidate PRS configurations; and selecting the recommended PRS configuration from the one or more candidate PRS configurations according to a configuration selection condition.

The base station may preset one or more candidate PRS configurations based on its own load situation and/or current network support capability. One or more candidate PRS configurations are sent to the UE through the system information. Different candidate PRS configurations may have different PRS periods, and/or PRS occupied bandwidths, and/or the numbers of TRPs, or the like.

The base station can send the system information by broadcasting. Or, the base station may unicast the system information to the UE through an RRC message based on the user's request.

After receiving the one or more candidate PRS configurations, the UE can select the recommended PRS configuration from the one or more candidate PRS configurations when there is a positioning requirement, and send it to the base station.

The configuration selection condition can be set according to the positioning requirement. The positioning requirements can be different positioning accuracies or the like. Different positioning accuracies requires different PRS configurations.

In this way, the base station determines the range of candidate PRS configurations, and the UE selects from the range of candidate PRS configurations, reducing the situation that the UE blindly determines the recommended PRS configuration and thus improving the efficiency of determining the PRS configuration.

In some embodiments, step 401 may include: sending the first request message carrying a configuration identifier of the recommended PRS configuration.

The base station can identify each candidate PRS configuration. A unique configuration identifier can be set for each candidate PRS configuration.

When the base station delivers the candidate PRS configurations, it can carry the configuration identifiers of the candidate PRS configurations at the same time.

For example, the configuration identifier 1 corresponds to the candidate PRS configuration including: PRS period 1, PRS bandwidth 1, and the like.

After receiving the candidate PRS configurations and the configuration identifiers of the candidate PRS configurations, the UE selects the recommended PRS configuration from the candidate PRS configurations, and sends the recommended PRS configuration. The UE can send the detailed configuration of the recommended PRS configuration, such as the period; it can also carry the recommended PRS configuration at the same time; or it can also send only the configuration identifier of the recommended PRS configuration.

In this way, when only the configuration identifier of the recommended PRS configuration is sent, the amount of data sent can be reduced, thereby reducing the overhead.

In some embodiments, the one or more candidate PRS configurations are carried in new radio downlink PRS assistance data of new radio downlink measurement assistance data information element (IE) of a type 6-1 of the system information.

The new radio downlink PRS assistance data (nr-DL-PRS-AssistanceData) in the new radio downlink measurement assistance data information element (the NR-DL-Measurement-AD) in the positioning system message type 6-1 (posSibType6-1) carries the one or more candidate PRS configurations.

In this way, the existing information is reused to carry the candidate PRS configurations, and the utilization efficiency of the existing information is improved.

In some embodiments, the method may further include: determining a predetermined PRS configuration as the recommended PRS configuration in response to not receiving the system information.

If the system message sent by the base station does not include the candidate PRS configurations, or the base station does not broadcast the positioning system message required by the current UE, the UE can directly send the recommended PRS configuration according to different positioning requirements.

The UE may set a plurality of predetermined PRS configurations according to different positioning requirements. If the system information including the candidate PRS configurations is not received, it selects one predetermined PRS configuration from the plurality of predetermined PRS configurations and determines it as the recommended PRS configuration.

In some embodiments, step 402 may include: receiving the target PRS configuration that is sent by the base station in response to the first request message, and receiving the PRS from the base station using the target PRS configuration.

If the base station does not send the candidate PRS configurations in advance, after the base station receives the recommended PRS configuration, the base station can determine the target PRS configuration in real time based on its own load situation and/or current network support capability and send it to the UE.

If the recommended PRS configuration is selected by the UE from the one or more candidate PRS configurations pre-sent by the base station, after the base station receives the recommended PRS configuration, it can select the target PRS configuration from the candidate PRS configurations that suit its own load situation and/or current network support capability. The target PRS configuration can be the same as or different from the recommended PRS configuration.

In response to the recommended PRS configuration in the first request message, after the base station determines the target PRS configuration, it can downlink the target PRS configuration to the UE by carrying the target PRS configuration in a RRC signaling or the like.

After receiving the target PRS configuration, the UE can receive the PRS on configuration resources such as a period and bandwidth indicated by the target PRS configuration according to the target PRS configuration, and then realize positioning.

In some embodiments, the positioning request information includes: a first IE including the recommended PRS configuration; and a second IE including a request of triggering system information.

The first IE is different from the second IE. The first IE may be a newly-added IE, or the first IE is an IE other than the second IE in the first request message that has reserved bits and can carry the recommended PRS configuration.

The UE may add an IE to the first request message to carry the recommended PRS configuration. The recommended PRS configuration can also be characterized by a configuration identifier.

For example, the UE may add an IE to the first request message to carry the configuration identifier of the recommended PRS configuration. For example, the PRS configuration represented by the configuration identifier 1: PRS period 1 and PRS bandwidth 1.

Or the UE may add an IE to the first request message to carry detailed configuration information of the recommended PRS configuration. For example, a new IE is added, and the IE includes: PRS period, PRS bandwidth and other information.

Using the newly added IE to carry the recommended PRS configuration can increase the amount of information carried in the existing information and improve the efficiency of the first request message.

In some embodiments, step 401 may include: sending the first request message carrying the recommended PRS configuration in an on-demand manner.

The on-demand manner may be a manner in which the UE receives one or more candidate PRS configurations when there is a positioning requirement, and selects the recommended PRS configuration from one or more candidate PRS configurations, and sends it to the base station.

In the on-demand manner, the UE can receive the system information with the candidate PRS configurations only when required, and/or analyze the candidate PRS configurations in the system information. It can save the cost of the UE.

In some embodiments, sending the first request message carrying the recommended PRS configuration in the on-demand manner includes one of the following: sending a DedicatedSIBRequest carrying the recommended PRS configuration; or sending a dedicated RRCSystemInfoRequest carrying the recommended PRS configuration.

When the UE is in the RRC connected state, the recommended PRS configuration can be carried in the DedicatedSIBRequest message.

When the UE is in the idle or inactive state, the recommended PRS configuration can be carried in the RRCSystemInfoRequest message.

In this way, using different messages to carry the recommended PRS configuration can adapt to different UE states, which improves the adaptability of the recommended PRS configuration in the uplink.

An example is provided below in conjunction with any of the foregoing embodiments.

The base station sends the positioning system message required by the positioning of the UE. The positioning system message includes configuration information of the downlink PRS applicable by the current network. The network can support a plurality of candidate PRS configurations.

Candidate PRS configurations indicate different PRS configurations that the network can support, to satisfy different positioning requirements. For example: different PRS periods and PRS bandwidths, different TRP numbers, etc. In detail, each candidate PRS configuration can be identified, that is, each candidate PRS configuration has a configuration identifier. For example, the identifier 1 corresponds to the candidate PRS configuration: PRS period 1, PRS bandwidth 1. The nr-DL-PRS-AssistanceData in the NR-DL-Measurement-AD in the positioning system message type 6-1 (pos-SibType6-1) carries a plurality of candidate PRS configurations supported by the network.

When the UE requests the positioning system message in the on-demand manner, the recommended PRS configuration of the UE can be carried in the request message. The recommended PRS configuration can include PRS bandwidth, PRS period, etc.

The recommended PRS configuration of the UE can be one of the plurality of candidate PRS configurations broadcasted by the base station; that is, the UE obtains the candidate PRS configurations that the current network can support through the positioning system message, and combines the positioning type, positioning accuracy, and different positioning requirement, to select one recommended PRS configuration from the plurality of candidate PRS configurations supported by the network and report.

If the positioning system message does not include the candidate PRS configurations that the network can support, or the network does not broadcast the positioning system message required by the current UE, the UE can directly send the recommended PRS configuration based on different positioning requirements.

When the UE sends the request information for requesting the positioning system message, it can be implemented by adding an IE to the request information. The different values of the IE correspond to one recommended PRS configuration; for example, 01 corresponds to one recommended PRS configuration represented by: PRS period 1, and PRS bandwidth 1.

For the case where the configuration flag is not set, the UE needs to clearly indicate the recommended PRS configuration when requesting the positioning system message, for example, a new IE is added, which includes the PRS period, PRS bandwidth, etc.

For the RRC connected UE, the PRS configuration can be recommended in the DedicatedSIBRequest message; and for the RRC idle or inactive UE, the recommend PRS configuration can be added to the RRCSystemInfoRequest message.

After the network receives the positioning system message request sent by the UE, it can send the updated target PRS configuration to the UE according to the recommended PRS configuration of the UE. The target PRS configuration can be the same as or different from the recommended PRS configuration.

Figure 5:
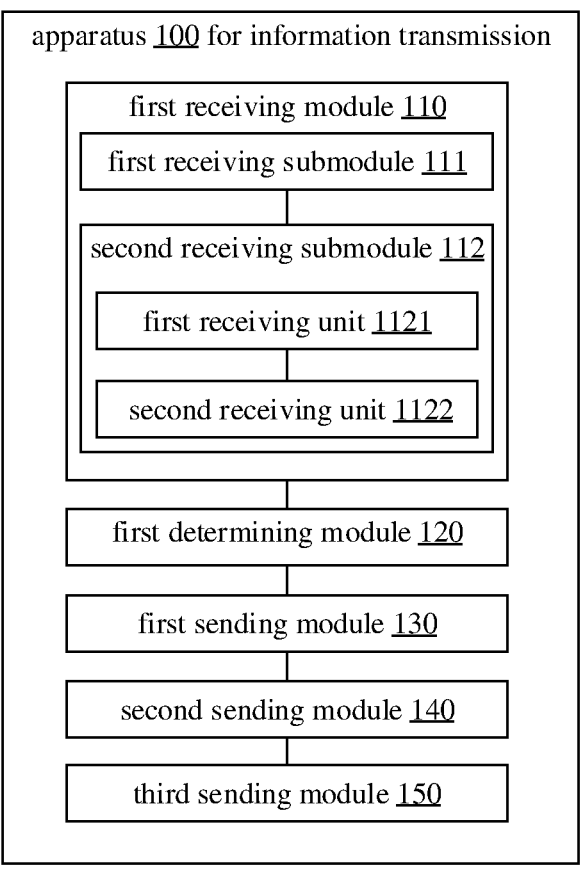
FIG. 5 is a block diagram of an apparatus for information transmission according to some embodiments.

Embodiments of the disclosure also provide an apparatus for information transmission, which is applicable to a base station. FIG. 5 is a block diagram of an apparatus 100 for information transmission according to some embodiments of the disclosure. As illustrated in FIG. 5, the apparatus 100 includes: a first receiving module 110, a first determining module 120, and a first sending module 130.

The first receiving module 110 is configured to receive a first request message carrying recommended PRS configuration.

The first determining module 120 is configured to determine a target PRS configuration according to the recommended PRS configuration.

The first sending module 130 is configured to send a PRS to a UE using the target PRS configuration.

In some embodiments, the apparatus 100 further includes a second sending module 140 configured to send system information, in which the system information carries one or more candidate PRS configurations, and the one or more candidate PRS configurations are configured for the UE to select the recommended PRS configuration according to a configuration selection condition.

In some embodiments, the first receiving module 110 includes a first receiving submodule 111 configured to receive the first request message carrying a configuration identifier of the recommended PRS configuration.

In some embodiments, the one or more candidate PRS configurations are carried in new radio downlink PRS assistance data of new radio downlink measurement assistance data IE of a type 6-1 of the system information.

In some embodiments, the apparatus 100 further includes a third sending module 150 configured to send the target PRS configuration to the UE in response to the first request message, in which the target PRS configuration is configured to indicate the UE to receive the PRS.

In some embodiments, the first request message includes: a first IE including the recommended PRS configuration; and a second IE including a request of triggering system information.

In some embodiments, the first receiving module 110 includes a second receiving submodule 112, configured to receive the first request message carrying the recommended PRS configuration, sent by the UE in an on-demand manner.

In some embodiments, the second receiving submodule 112 includes one of the following: a first receiving unit 1121, configured to receive a DedicatedSIBRequest carrying the recommended PRS configuration; or a second receiving unit 1122, configured to receive a dedicated RRCSystemInfoRequest carrying the recommended PRS configuration.

Figure 6:
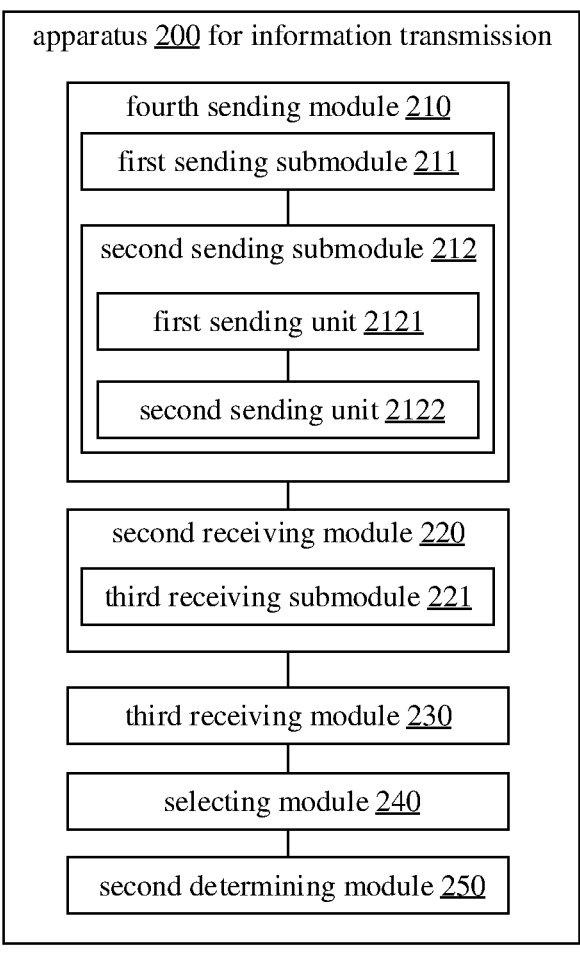
FIG. 6 is a block diagram of an apparatus for information transmission according to some embodiments.

Embodiments of the disclosure also provide an apparatus for information transmission, which is applicable to a UE. FIG. 6 is a block diagram of an apparatus 200 for information transmission according to some embodiments of the disclosure. As illustrated in FIG. 6, the apparatus 200 includes: a fourth sending module 210 and a second receiving module 220.

The fourth sending module 210 is configured to send a first request message carrying recommended PRS configuration; in which the recommended PRS configuration is configured for a base station to determine a target PRS configuration.

The second receiving module 220 is configured to receive a PRS from the base station using the target PRS configuration.

In some embodiments, the apparatus 200 further includes: a third receiving module 230, configured to receive system information before sending the first request message carrying the recommended PRS configuration, in which the system information carries one or more candidate PRS configurations; and a selecting module 240, configured to select the recommended PRS configuration from the one or more candidate PRS configurations according to a configuration selection condition.

In some embodiments, the fourth sending module 210 includes a first sending submodule 211, configured to send the first request message carrying a configuration identifier of the recommended PRS configuration.

In some embodiments, the one or more candidate PRS configurations are carried in new radio downlink PRS assistance data of new radio downlink measurement assistance data information element (IE) of a type 6-1 of the system information.

In some embodiments, the apparatus 200 further includes a second determining module 250, configured to determine a predetermined PRS configuration as the recommended PRS configuration in response to not receiving the system information.

In some embodiments, the second receiving module 220 includes a third receiving submodule 221, configured to receive the target PRS configuration, that is sent by the base station in response to the first request message, and receive the PRS from the base station using the target PRS configuration.

In some embodiments, the positioning request information includes: a first IE including the recommended PRS configuration; and a second IE including a request of triggering system information.

In some embodiments, the fourth sending module 210 includes a second sending submodule 212, configured to send the first request message carrying the recommended PRS configuration in an on-demand manner.

In some embodiments, the second sending submodule 212 includes one of the following: a first sending unit 2121, configured to send a DedicatedSlBRequest carrying the recommended PRS configuration; or a second sending unit 2122, configured to send a dedicated RRCSystemInfoRequest carrying the recommended PRS configuration.

In some embodiments, the first receiving module 110, the first determining module 120, the first sending module 130, the second sending module 140, the third sending module 150, the fourth sending module 210, the second receiving module 220, and the third receiving module 230, the selecting module 240, and the second determining module 250 can be configured by one or more of: central processing units (CPUs), graphics processing unit (GPUs), baseband processors (BPs), application specific integrated circuits (ASICs), DSPs, programmable logic devices (PLDs), complex programmable logic devices (CPLDs), field programmable gate arrays (FPGAs), general purpose processors, controllers, micro controller units (MCUs), microprocessors or other electronic components, in combination with one or more radio frequency (RF) antennas to perform the foregoing methods.

Figure 7:
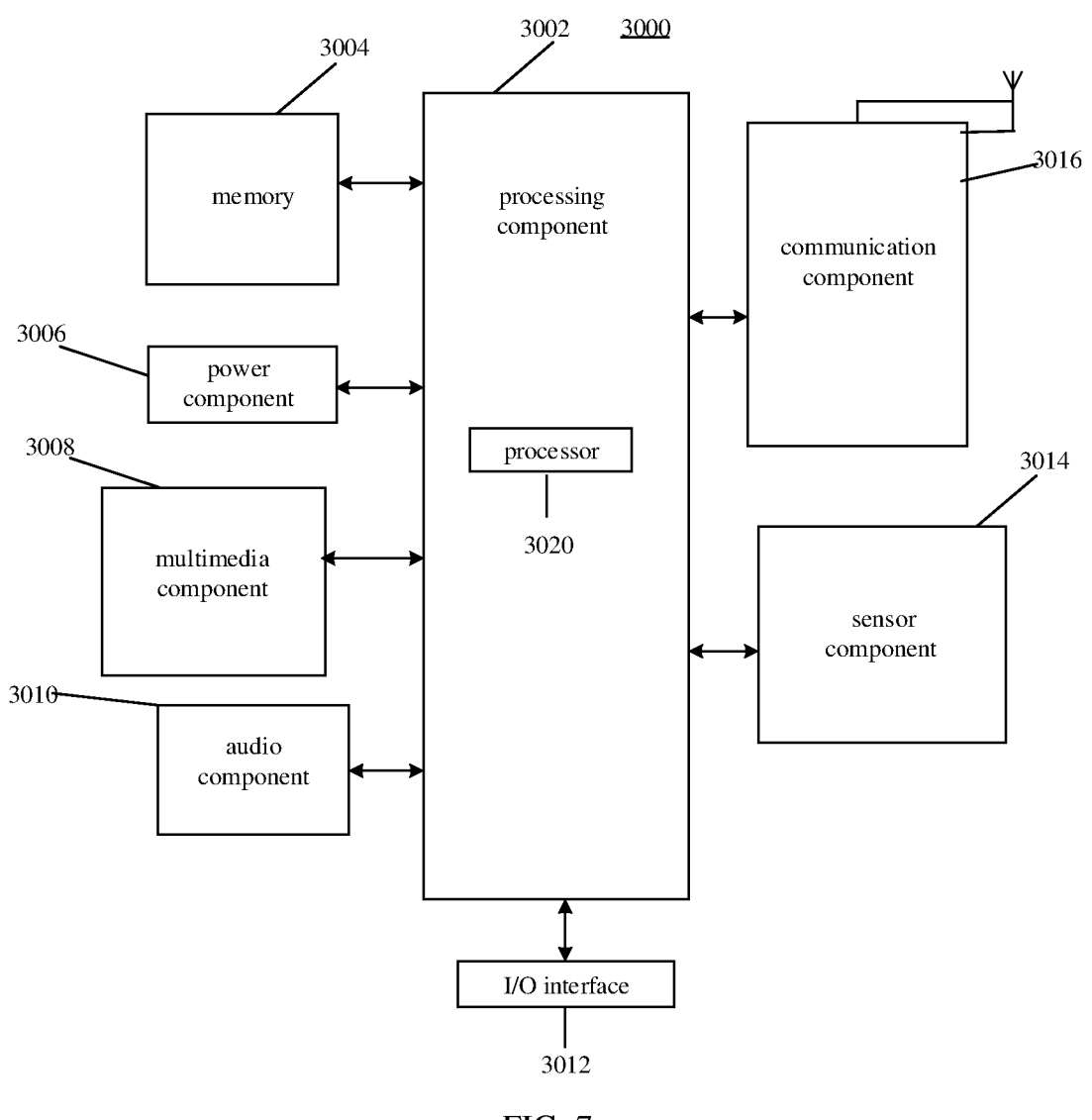
FIG. 7 is a block diagram of a device for information transmission according to some embodiments.

FIG. 7 is a block diagram of a device 3000 for information transmission according to some embodiments. For example, the device 3000 may be any of the terminal or the base station described above, such as a mobile phone, a computer, a digital broadcast terminal, a messaging device, a gaming console, a tablet, a medical device, exercise equipment, a personal digital assistant, and the like.

Referring to FIG. 7, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any disclosures or methods operated on the device 3000, contact data, phonebook data, messages, pictures, video, etc. The memory 3004 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like.

The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging disclosures. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In one exemplary embodiment, the communication component 3016 receives a broadcast signal or broadcast associated information from an external broadcast management system via a broadcast channel In one exemplary embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3000 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3004, executable by the processor 820 in the device 3000, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for information transmission, performed by a base station, comprising:
sending system information, wherein the system information carries at least one available positioning reference signal (PRS) configuration, the at least one available PRS configuration is configured for a user equipment (UE) to determine a recommended PRS configuration, and each available PRS configuration carries a configuration identifier of the available PRS configuration, wherein the at least one available PRS configuration is carried in a type 6-1 of the system information;
receiving a first request message carrying the recommended PRS configuration;
determining a target PRS configuration according to the recommended PRS configuration; and
sending a PRS to the UE using the target PRS configuration.

2. The method of claim 1, wherein receiving the first request message carrying the recommended PRS configuration comprises:
receiving the first request message carrying a configuration identifier of the recommended PRS configuration.

3. The method of claim 1, further comprising:
sending the target PRS configuration to the UE in response to the first request message, wherein the target PRS configuration is configured to indicate the UE to receive the PRS.

4. The method of claim 1, wherein receiving the first request message-carrying the recommended PRS configuration comprises:
receiving the first request message carrying the recommended PRS configuration, sent by the UE in an on-demand manner.

5. The method of claim 4, wherein receiving the first request message carrying the recommended PRS configuration, sent by the UE in the on-demand manner, comprises one of:
receiving a dedicated system information block request carrying the recommended PRS configuration; or
receiving a dedicated radio resource control system information request carrying the recommended PRS configuration.

6. A method for information transmission, performed by a user equipment (UE), comprising:
receiving system information, wherein the system information carries at least one available positioning reference signal (PRS) configuration, and each available PRS configuration carries a configuration identifier of the available PRS configuration;
determining a recommended PRS configuration from the at least one available PRS configuration, wherein the at least one available PRS configuration is carried in a type 6-1 of the system information;
sending a first request message carrying the recommended PRS configuration, wherein the recommended PRS configuration is configured for a base station to determine a target PRS configuration; and
receiving a PRS sent by the base station based on the target PRS configuration.

7. The method of claim 6, wherein sending the first request message carrying the recommended PRS configuration comprises:

sending the first request message carrying a configuration identifier of the recommended PRS configuration.

8. The method of claim 6, further comprising:

determining a predetermined PRS configuration as the recommended PRS configuration in response to not receiving the system information.

9. The method of claim 6, wherein receiving the PRS sent by the base station based on the target PRS configuration comprises:

receiving the target PRS configuration, sent by the base station in response to the first request message; and receiving the PRS from the base station based on the received target PRS configuration.

10. The method of claim 6, wherein sending the first request message carrying the recommended PRS configuration comprises:

sending the first request message carrying the recommended PRS configuration in an on-demand manner.

11. The method of claim 10, wherein sending the first request message carrying the recommended PRS configuration in the on-demand manner comprises one of:

sending a dedicated system information block request carrying the recommended PRS configuration; or sending a dedicated radio resource control system information request carrying the recommended PRS configuration.

12. A communication device, comprising:

a processor;

a transceiver; and a memory storing a program executable by the processor, wherein the processor is configured to:

send system information, wherein the system information carries at least one available positioning reference signal (PRS) configuration, the at least one available PRS configuration is configured for a user equipment (UE) to determine a recommended PRS configuration, and each available PRS configuration carries a configuration identifier of the available PRS configuration, wherein the at least one available PRS configuration is carried in a type 6-1 of the system information;

receive a first request message carrying the recommended PRS configuration;

determine a target PRS configuration according to the recommended PRS configuration; and send a PRS to the UE using the target PRS configuration.

13. A non-transitory storage medium having stored thereon a program that, when executed by a processor, causes the processor to perform the method of claim 1.

14. A communication device, comprising:

a processor;

a transceiver; and a memory storing a program executable by the processor, wherein the processor is configured to perform the method of claim 6.

15. The method of claim 1, wherein the first request message comprises:

a first information element (IE) comprising the recommended PRS configuration; and a second IE comprising a request of triggering system information.

16. The method of claim 6, wherein the first request message comprises:

a first information element (IE) comprising the recommended PRS configuration; and a second IE comprising a request of triggering system information.

* * * * *